United States Patent [19]

Toriya et al.

[11] Patent Number: 4,781,996
[45] Date of Patent: Nov. 1, 1988

[54] FUEL CELL

[75] Inventors: Hajime Toriya; Akio Sohma, both of Hitachi; Keizou Ohtsuka, Katsuta, all of Japan

[73] Assignee: Hitachi, Ltd., Tokyo, Japan

[21] Appl. No.: 61,219

[22] Filed: Jun. 12, 1987

[30] Foreign Application Priority Data

Jun. 13, 1986 [JP] Japan .................. 61-135926

[51] Int. Cl.⁴ ................................ H01M 2/08
[52] U.S. Cl. ............................ 429/36; 429/16
[58] Field of Search ................... 429/16, 36

[56] References Cited

U.S. PATENT DOCUMENTS

| | | | |
|---|---|---|---|
| 3,323,950 | 6/1967 | Hilton et al. | 429/36 |
| 4,554,225 | 11/1985 | Sounai | 429/16 X |
| 4,579,788 | 4/1986 | Marianowski et al. | 429/16 |
| 4,605,602 | 8/1986 | Feigenbaum et al. | 429/36 X |
| 4,609,595 | 9/1986 | Nickors | 429/36 X |

Primary Examiner—Brian E. Hearn
Assistant Examiner—Stephen J. Kalafut
Attorney, Agent, or Firm—Antonelli, Terry & Wands

[57] ABSTRACT

The fuel cell of this invention has the following electrolyte plate and separator plate.

An electrolyte plate made of ceramics which is interposed between an anode and a cathode which are arranged opposite to each other.

A separator plate which is laminated on the back surface of each of the anode and cathode and which is made of such a material and in such a composition that the expansion coefficient thereof is nearly equal to that of the electrolyte plate.

According to the above construction, tensile stress applied to the electrolyte plate due to a change in temperature can be reduced and cracking of the electrolyte plate which may occur with lapse of time can be prevented.

8 Claims, 6 Drawing Sheets

FUEL CELL

BACKGROUND OF THE INVENTION

This invention relates to a fuel cell and especially to improvement of durability to the heat cycle of a molten carbonate fuel cell.

Structure of the conventional fuel cell shown in FIG. 2 is explained below.

In FIG. 2, cathode 3 and anode 2 are placed above and under electrolyte plate 1 to interpose the electrolyte plate 1 therebetween, forming a unit cell. The unit cells are laminated via separator plates 4 having fuel flow grooves 5 which supply fuel gas to anode 2 and oxidizer flow grooves 6 which supply an oxidizer gas to cathode 3. The conventional electrolyte plate is made of porous ceramic plates of lithium aluminate powder ($LiAlO_2$ powder) reinforced with alumina fibers, etc.

As electrode material, a sintered Ni porous material has been used for anode and a NiO porous material for cathode.

As materials for separator plates, there have been used high temperature corrosion resistant materials such as austenite stainless steels, for example, SUS316, SUS304, SUS310, etc.

As electrolytes, there have been used mixtures of carbonates such as $Li_2CO_3$, $K_2CO_3$, $Na_2CO_3$, etc., which are impregnated in the electrolyte plate. The electrolytes are solid at room temperature and melt at higher than about 490° C. and flow to the interfacial boundary of the electrode and the separator groove to bring about a chemical reaction to generate power.

On the side of anode 2, a reducing reaction with hydrogen takes place and on the side of cathode 3, an oxidation reaction takes place with oxygen in air in an alkali atmosphere. Therefore, a corrosion resistant austenite steel is used for the separator plate.

The unit cells are laminated in a compressed state under a certain load to increase reactivity and to prevent leakage of gas to outside.

Shown FIG. 3(A) as characteristics during operation of the cell, after temperature is elevated, a fuel and an oxidizing gas are introduced to generate power. After completion of power generation, temperature is gradually reduced to room temperature.

In the future, the fuel cell is promising as a substitute for thermal power plants and further, it is expected that nuclear power plants will be used for base load and fuel cells will be used for daily load.

Therefore, the fuel cell is required to be excellent in heat cycle property so that it can withstand daily load operation (DSS operation).

FIG. 3(B) shows changes in elongation of the parts in a fuel cell at starting-up and stopping. With elevation of temperature during starting-up, elongation of the separator plate and electrolyte plate of the cell occurs as shown by $\delta_S$ and $\delta_E$, respectively. The elongation $\delta_S$ of the separator plate is larger than the elongation $\delta_E$ of the electrolyte plate. This is because the linear expansion coefficient of the separator plate is greater than that of the electrolyte plate as shown in FIG. 4.

FIG. 5(A) is a plan view and FIG. 5(B) is a sectional view, wherein the arrows indicate the direction of elongation of a cell body. As can be seen from these figures, with an increase in cell temperature, elongation occurs from the center in four directions. The elongation $\delta_S$ of the separator plate 4 is greater than the elongation $\delta_E$ of the electrolyte plate and since the cell undergoes compression load F, electrolyte plate 1 tends to elongate owing to the elongation $\delta_S$ of separator plate 4. Therefore, electrolyte plate 1 which is lower than separator plate 4 in tensile strength undergoes repeated tension and compression at every starting and stopping of the cell (elevation and reduction of temperature).

Japanese Patent KOKAI (Laid-Open) No. 71564/83 discloses a conventional method of preventing the electrolyte plate from cracking due to the heat cycle, but this method gives no consideration to matching the expansion coefficient of the electrolyte plate and that of the separator plate.

Generally, ceramic materials are high in strength against compression, but are low in tensile strength and hence the problem is fatigue strength of the electrolyte plate at a heat cycle.

When cracking of the electrolyte plate occurs due to the fatigue, hydrogen on the anode side mixes with air on the cathode side to bring about an oxidation reaction to produce water. As a result, heat is generated simultaneously with considerable reduction of power generation reaction, resulting in problems of corrosion of the separator plate or electrode to cause a reduction of the lifetime of the cell body.

SUMMARY OF THE INVENTION

The object of this invention is to provide a fuel cell superior in durability to a heat cycle and capable of maintaining high power generation efficiency.

The above object is achieved by providing a fuel cell which comprises electrolyte plates of ceramic each of which is interposed between an opposed anode and cathode and a separator plate of a metal therebetween, wherein the electrolyte plate and the separator plate are respectively made of such materials and in such compositions that the expansion coefficient of the former and that of the latter are nearly equal to each other.

According to the above proposed construction, since the elongation of the separator plate is nearly equal to that of the electrolyte plate, tensile strength applied to the electrolyte plate made of ceramic due to elongation of the separator plate is small, whereby cracking of the electrolyte plate is prevented, durability to a heat cycle of the fuel cell is improved and power generation efficiency can be kept at a high level.

DETAILED DESCRIPTION OF PREFERRED EMBODIMENTS

Examples of the fuel cells of this invention will be explained below.

First, it was attempted to make nearly equal the expansion coefficient of the separator plate and the electrolyte plate made of ceramic.

Figure 6:
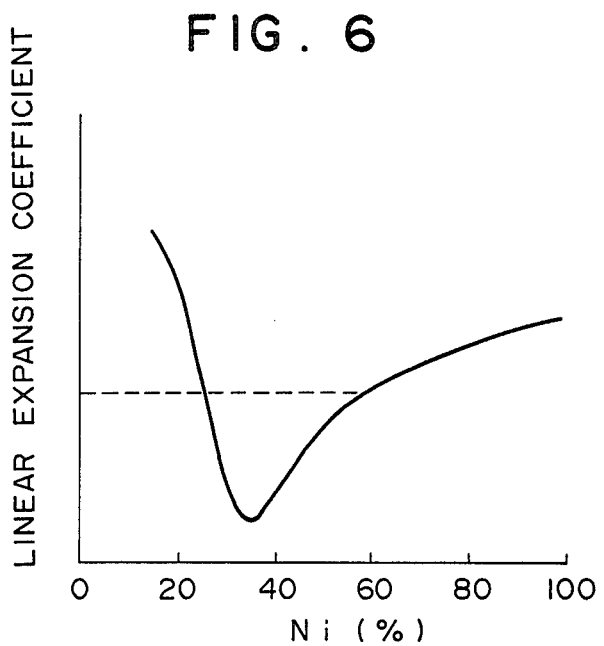
FIG. 6 is a graph which shows the change of linear expansion coefficient of an Ni-Fe alloy with change of Ni content.

FIG. 6 shows changes of the linear expansion coefficient of Fe-Ni binary alloys with a change of Ni content from 0% to 100% by weight (expressed merely by % hereinafter) at room temperature. As is recognized from FIG. 6, when Ni reaches about 36%, the linear expansion coefficient becomes minimum. Therefore, Ni content should be within the range of about 25-60% in order to match the linear expansion coefficient of the separator plate with the expansion coefficient (S1) of the electrolyte plate.

The characteristic of change in the linear expansion coefficient with a change in Ni content varies depending on the operating temperature of the fuel cell. That is, with an increase in operating temperature, the linear expansion coefficient increases and with a decrease in operating temperature, the linear expansion coefficient decreases. Therefore, a separator material having an expansion coefficient nearly equal to that of ceramic at a given operating temperature can be obtained by adjusting the Ni content in Fe.

As general materials which have a linear expansion coefficient nearly equal to that of ceramic materials, there are 42% Ni alloy (40-42% Ni and balance Fe or 42% Ni, 6% Cr and balance Fe), Kovar (28-29% Ni, 17-18% Co and balance Fe), etc. Linear expansion coefficients of alloys containing tungsten or molybdenum can also be made nearly equal to that of ceramic materials. Furthermore, various alloys which reduce linear expansion coefficients may also be used as separator materials.

Figure 7:
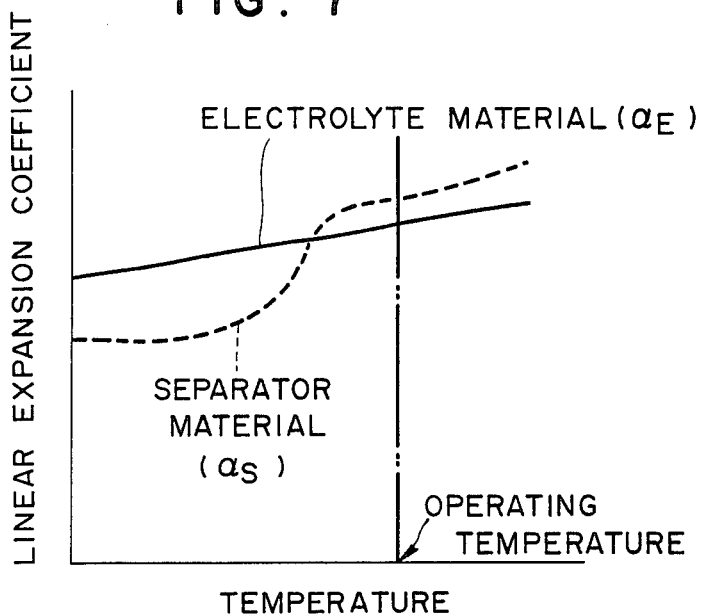
FIG. 7 is a graph which shows the relation between temperatures of electrolyte material and separator material and linear expansion coefficients thereof in one example of this invention.

FIG. 7 shows a graph which compares the linear expansion coefficient $\alpha s$ of a separator plate comprising 42% of Ni and the balance of Fe with the linear expansion coefficient $\alpha E$ of an electrolyte plate of a porous ceramic comprising a lithium aluminate powder incorporated with alumina fiber as a reinforcing material. The linear expansion coefficient of this separator plate is low, i.e., about $5 \times 10^{-6}$ 1/°C. at a cell operating temperature of up to about 450° C. and abruptly increases at higher temperatures to about $12 \times 10^{-6}$ 1/°C. On the other hand, the linear expansion coefficient of the electrolyte plate made of ceramic is low, namely, $6-8 \times 10^{-6}$ 1/°C.

Thus, since the expansion coefficient $\alpha s$ of separator material is nearly equal to the expansion coefficient $\alpha E$ of the electrolyte plate, tensile strength applied to the electrolyte plate by the separator can be reduced when they are used for fuel cells.

When expansion coefficients of both the separator material and the electrolyte material are, for example, within $\pm 4 \times 10^{-6}$ 1/°C., this is sufficient to prevent cracking of the electrolyte plate.

The above explanation is based on equalizing the expansion coefficient of the separator plate to that of the electrolyte plate, but it is also possible to equalize the expansion coefficient of the electrolyte plate to that of the separator plate. For this purpose, it is necessary to add a metallic material to the ceramic material to increase the expansion coefficient thereof. In this case, care should be taken to secure the insulation properties of the separator.

Figure 1:
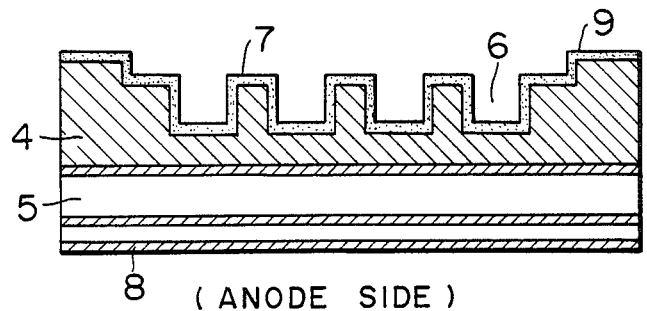
FIG. 1 is a sectional view which shows a construction of the one example of the separator part of the fuel cell according to this invention.
Figure 2:
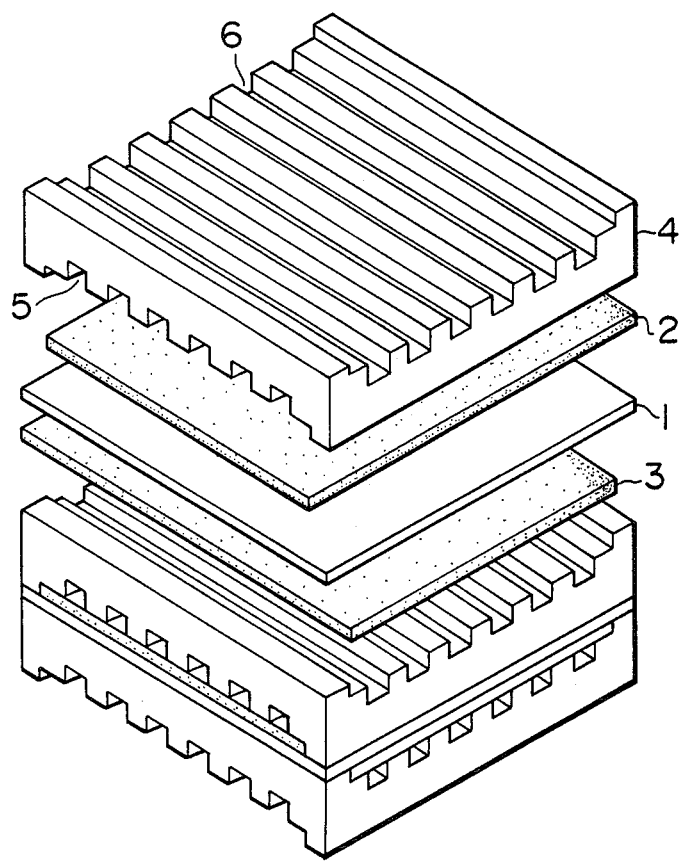
FIG. 2 is an oblique view which shows the state of lamination of a conventional fuel cell.
Figure 3A:
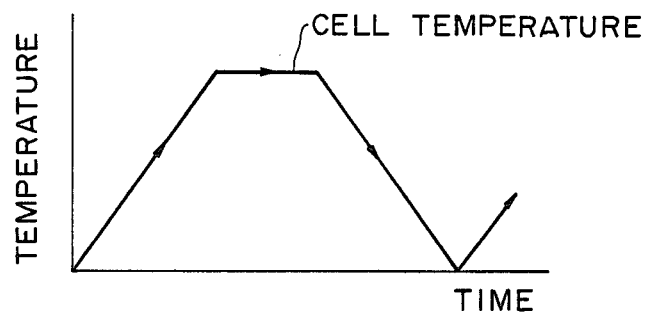
FIG. 3(A) is a graph which shows a change in cell temperature with time of the fuel cell shown in FIG. 2.
Figure 3B:
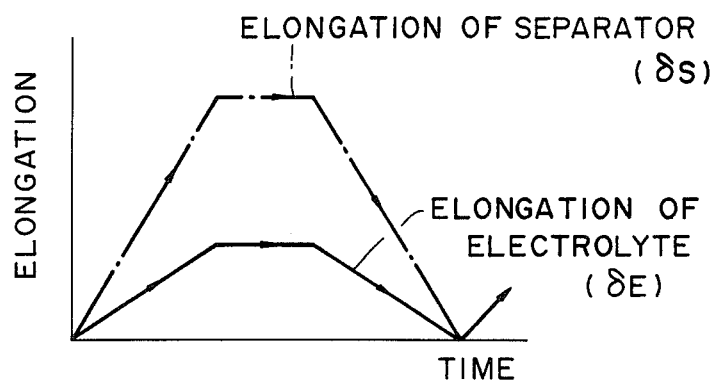
FIG. 3(B) is a graph which shows changes of elongation with time of the separator and the electrolyte plate.
Figure 4:
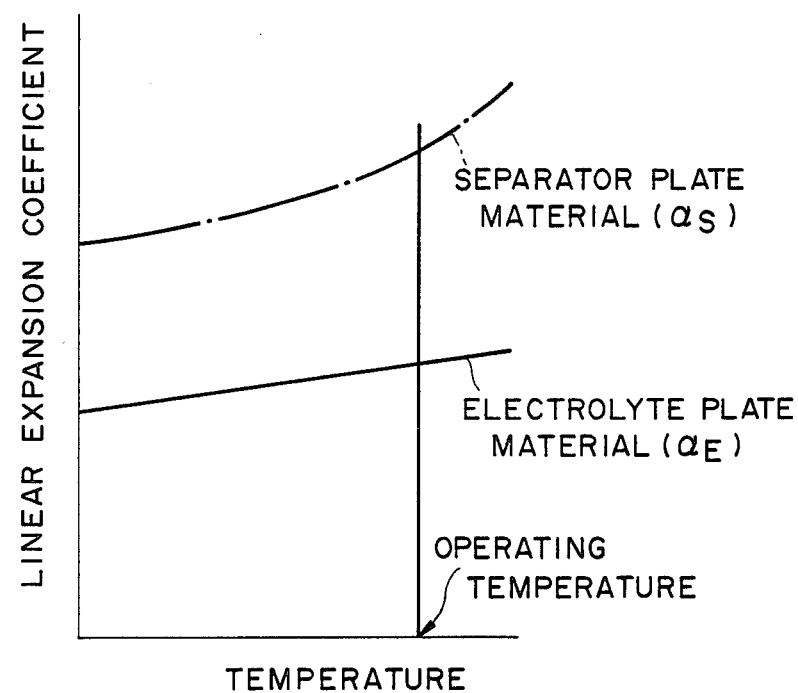
FIG. 4 is a graph which shows changes of linear expansion coefficients of separator material and the electrolyte plate of a conventional fuel cell.
Figure 5A:
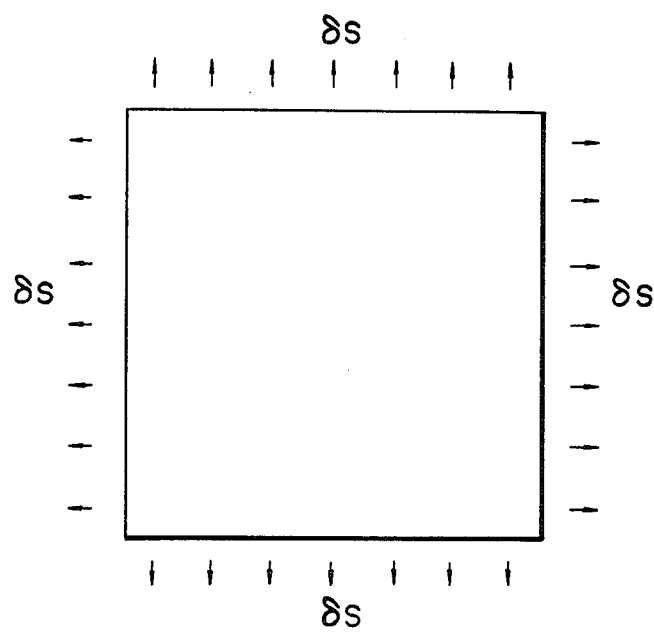
FIG. 5(A) is a plan view which shows the state of elongation of a conventional fuel cell.
Figure 5B:
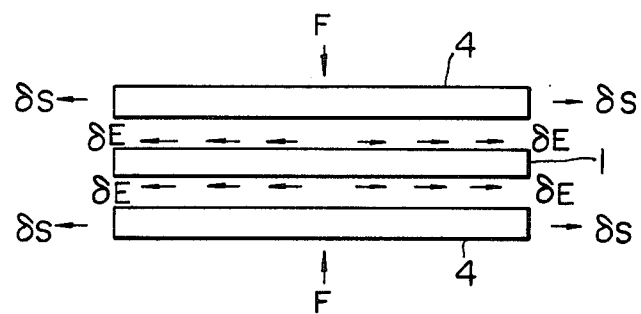
FIG. 5(B) is a sectional view which shows the state of elongation of the conventional fuel cell shown in FIG. 5(A).

FIG. 1 is a sectional view of one example of the fuel cells (molten carbonate electrolyte fuel cells) of this invention.

In FIG. 1, passage grooves 6 for cathode side gas (oxidizer gas) are provided on the cathode side of separator plate 4 and passage grooves 5 for anode side gas (fuel gas) are provided on the anode side at right angles with said passage grooves 6.

The separator is made of an Ni-containing Fe alloy, which is adjusted to have substantially the same expansion coefficient as that of the electrolyte plate.

Oxidation-resistant treating material 7 is bonded to the cathode side of the separator and alkali corrosion-resistant treating material 8 is bonded to the anode side. Especially, the corrosion-resistant treatment must be made to the gas passage and thus must be made to the cathode side grooves 6 and anode side grooves 5 of separator 4.

It is effective to make a treatment such as aluminizing or the like to wet sealing part 9 which is to prevent leakage of gas to the outside.

Figure 8:
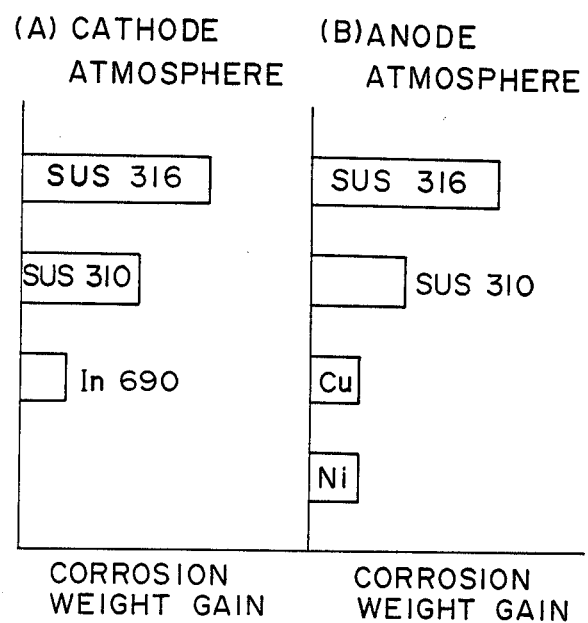
FIG. 8 is a diagram which shows the corrosion characteristic of metals in the gas atmosphere of cells.
Figure 9:
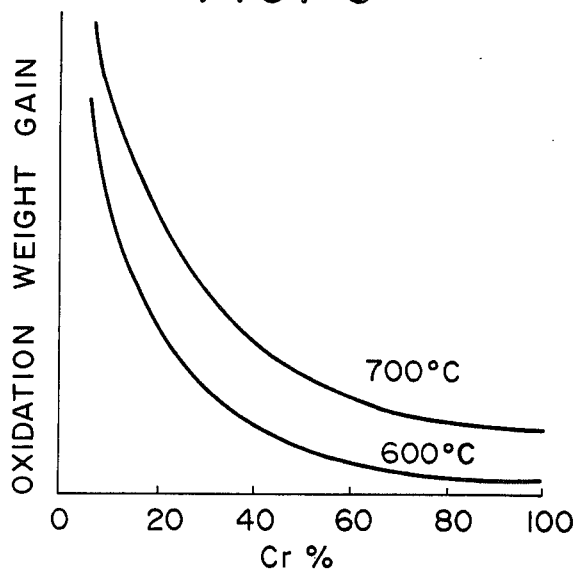
FIG. 9 is a graph which shows the relation between Cr content and oxidation weight gain of separator material.

FIG. 8 shows a graph indicating corrosion weight gain of separator materials in a molten salt. Oxidation reactions take place in the cathode atmosphere and each material exhibits the tendency as shown at (A). This is because corrosion weight gain decreases with an increase in Cr content. This tendency is shown in FIG. 9 with reference to Cr content. Oxidation weight gain decreases with an increase of Cr content at both the cell operating temperatures of 600° C. and 700° C. That is, surface treatment with Cr applied to the cathode side of the separator provides superior corrosion resistance.

With reference to corrosion in the anode atmosphere, as shown at (B) in FIG. 8, Cu and Ni are superior in corrosion resistance to austenite steels such as SUS316 and SUS310, and surface treatment with Cu or Ni is suitable for the anode side. When the separator material is high in Ni content, this is superior in corrosion resistance and surface treatment is unnecessary. The surface treatment generally includes plating, diffusing, flame spraying, welding, etc.

The anti-oxidation treatment for the cathode side may be effected by not only Cr treatment, but $Al_2O_3$ treatment, TiC treatment, etc.

Thus, improvement of corrosion resistance as well as improvement of heat cycle durability can be accomplished by subjecting the surface of the separator to corrosion resistant treatment.

In the above example, as base plates for separator materials, there can be used those of high Ni content. As a result, hardness of the base plate decreases and so, workability increases as compared with austenite steels.

Further, since the separator material is subjected to corrosion resistant surface treatment, both the prevention of the cracking of electrolyte plate and the improvement of cell life can be achieved.

As explained hereinabove, according to the fuel cell of this invention, since the expansion coefficient of the electrolyte plate and that of the separator are nearly the same, application of tensile stress to the electrolyte plate made of ceramic can be prevented. Therefore, cracking of the electrolyte plate with lapse of time can be prevented, durability to heat cycle can be improved and power generation efficiency can be kept at a high level.

What is claimed is:

1. A fuel cell comprising a stack of cell units, each of which comprises an anode, a cathode provided opposite to said anode, an electrolyte plate made of ceramic interposed between said anode and said cathode and a separator plate laminated on the back surface of each of said anode and said cathode, said separator plate being made of a material consisting essentially of 25 to 60% by weight of nickel and the balance of iron, wherein an expansion coefficient of the separator plate is substantially equal to that of the electrolyte plate.

2. A fuel cell according to claim 1 wherein the separator plate comprises 25-60% by weight of Ni and balance of Fe.

3. A fuel cell according to claim 1, wherein a cathode side of the separator plate has an oxidation resistant surface.

4. A fuel cell according to claim 1, wherein an anode side of the separator plate has a corrosion resistant surface.

5. A fuel cell comprising a stack of cell units, each of which comprises an anode, a cathode provided opposite to said anode, a separator plate made of a metal and laminated on the back surface of each of said anode and said cathode and an electrolyte plate interposed between said anode and said cathode, said separator plate being made of a material consisting essentially of 25 to 60% by weight of nickel and the balance of iron, wherein an expansion coefficient of the electrolyte plate is substantially equal to that of said separator plate.

6. A fuel cell comprising a stack of cell units, each of which comprises an anode, a cathode provided opposite to said anode, an electrolyte plate made of porous ceramic comprising a lithium aluminate powder incorporated with an alumina fiber and interposed between said anode and said cathode under a given pressure and a separator plate laminated on the back surface of each of said anode and said cathode, said separator plate being made of a material consisting essentially of 25 to 60% by weight of nickel and the balance of iron, wherein a difference in the expansion coefficient of the separator plate and the electrolyte plate is within $\pm 4 \times 10^{-6}$ 1/°C.

7. A fuel cell according to claim 1, wherein a difference in the coefficient of thermal expansion between the separator plate and the electrolyte plate within $\pm 4 \times 10^{-6}$ 1/°C.

8. A fuel cell according to claim 1, wherein the ceramic is lithium aluminate reinforced with alumina fibers.

* * * * *